(12) United States Patent
Dohnal et al.

(10) Patent No.: US 6,307,283 B1
(45) Date of Patent: Oct. 23, 2001

(54) POSITION SIGNALLING DEVICE FOR A MOTOR DRIVE

(75) Inventors: Dieter Dohnal, Lappersdorf; Franz Griesbacher, Köfering; Michael Holmer, Hynderdorf, all of (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 0 days.

(21) Appl. No.: 09/424,004

(22) PCT Filed: Jan. 9, 1998

(86) PCT No.: PCT/EP98/00090

§ 371 Date: Nov. 15, 1999

§ 102(e) Date: Nov. 15, 1999

(87) PCT Pub. No.: WO98/53276

PCT Pub. Date: Nov. 26, 1998

(30) Foreign Application Priority Data

May 16, 1997 (DE) .............................. 197 20 617

(51) Int. Cl.[7] .......................... H01H 9/54; H01H 19/62; G01D 5/251; G08C 19/30

(52) U.S. Cl. ................. 307/139; 200/11 TC; 307/149; 323/341

(58) Field of Search ................ 200/11 TC, 18; 307/38, 40, 41, 139, 141, 143, 112–138, 140, 142–157; 361/24, 71, 86, 88; 323/340, 341

(56) References Cited

U.S. PATENT DOCUMENTS

| 4,014,741 | * | 3/1977 | Foxworthy | 335/206 X |
|---|---|---|---|---|
| 4,144,521 | * | 3/1979 | Lehnhert | 340/625 |
| 5,523,674 | * | 6/1996 | Dohnal et al. | 323/340 |
| 5,675,250 | * | 10/1997 | Berglund et al. | 324/207.25 |
| 5,736,827 | * | 4/1998 | Dohnal et al. | 307/143 X |
| 5,785,552 | * | 7/1998 | Dohnal et al. | 200/11 TC |
| 6,060,669 | * | 5/2000 | Dohnal et al. | 200/11 TC |
| 6,087,607 | * | 7/2000 | Dohnal et al. | 200/574 |
| 6,091,032 | * | 7/2000 | Dohnal et al. | 200/11 TC |
| 6,100,674 | * | 8/2000 | Dohnal et al. | 323/256 |
| 6,124,726 | * | 9/2000 | Dohnal et al. | 323/341 X |

FOREIGN PATENT DOCUMENTS

| 2701572-A1 | * | 7/1978 | (DE) . |
| 2720761-A1 | * | 11/1978 | (DE) . |
| 42 14 431 | | 11/1993 | (DE) . |
| 2317629 | * | 2/1977 | (FR) . |
| 2265587-A1 | * | 10/1993 | (GB) . |

OTHER PUBLICATIONS

Motor Drive Unit MA 7 Operating Instructions, Maschinenfabrik Reinhausen, pp. 1–27, English and German, Jun. 1994.

* cited by examiner

Primary Examiner—J. R. Scott
(74) Attorney, Agent, or Firm—Herbert Dubno

(57) ABSTRACT

A position indicator for step switches and tap selectors of transformers and the like has a contact array connected to the motor drive and connected by a plug to the plug of a connector which, in turn, is connected by plugs to the information-generating module which outputs to the display. One of the pairs of plugs between the contact array and the connector or between the connector and the module can be reversed relative to the other to signal a different sense of rotation of the motor drive.

5 Claims, 10 Drawing Sheets

| POSITION | 1 | 2 | 3 | 4 | 5 | 6 | 7 | 8 | 9 | 10 | 11 | 12 | 13 | 14 | 15 | 16 | 17 | 18 | | | 19 | 20 | 21 | 22 | 23 | 24 | 25 | 26 | | | 34 | 35 | 36 |
|---|---|---|---|---|---|---|---|---|---|---|---|---|---|---|---|---|---|---|---|---|---|---|---|---|---|---|---|---|---|---|---|---|---|
| PIN | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 38 | 39 | 40 |

FIG.3

POSITION SIGNALLING DEVICE FOR A MOTOR DRIVE

CROSS REFERENCE TO RELATED APPLICATIONS

This application is the U.S. national phase of PCT application PCT/EP98/00090 filed Jan. 9, 1998 with a claim to the priority of German patent application 19720617.4 itself filed May 16, 1997.

FIELD OF THE INVENTION

The invention relates to a position-signalling device for motor drives of step switches, tap changers or dipper coils.

BACKGROUND OF THE INVENTION

Position-signalling devices as components of the motor drive serve for remote indication of position, or to provide information regarding the respective current position of the step switch or the like.

Such devices detect this current position electrically and process the obtained information correspondingly. The processed information then becomes the starting point and the prerequisite for the current (remote) position reading, which for instance is done optically by a lamp indicator or a dial-type instrument.

Such position-signalling devices are known from the internal company papers "Motor Antriebe MA7", (Motor Drive MA7), publication BA 40/90de-0391/2000 of the applicant. They consist of an array of signalling contacts which correspond to various operating positions of the step switch or the like and are arranged in a circle and can be switched on and off by a mobile sliding contact.

In practice numerous different variants are in use for processing the obtained information about the current position and are applicable to different situations.

Position-signalling arrays for lamp indicators switch with interruption from one signalling contact to the next. The mobile sliding contact and the signalling contacts of the contact path are connected through terminals.

Position-signalling devices for remote indication by means of dial-type instruments switch without interruption from one signalling contact to the next. For n operating positions n−1 step rheostats are built in between the signalling contacts. The beginning and the end of the contact path, as well as the mobile sliding contact are connected to terminals.

Position-signalling devices using a diode matrix deliver a coded processed signal, e.g. in BCD or Gray code.

Position-signalling devices for decimal lamp signals make possible a decimal reading.

In position-signalling devices with a break contact path the contact opens in the respective operational position.

According to the state of the art for each of the applications, special specifically designed signalling-contact arrays are made with special components tailored to the particular case. For instance in the embodiment for the remote reading by means of a dial-type instrument, as a rule a crossed coil instrument, the required individual rheostats are provided directly between the individual signalling contacts, which are swept by the sliding contact.

These known position-signalling devices, specialized for the respective type of application, have several disadvantages. On the one hand the manufacturing and the rating of the various signalling-contact arrays with their different components in various configurations are complicated and expensive. On the other hand it is not possible to adapt the position-signalling device in a flexible manner to changing requirements, which for instance could result from a short-term change of the manner in which the position indication is displayed, for instance when a lamp signal has to be replaced by a dial-type instrument with a crossed coil.

OBJECTS OF THE INVENTION

It is the object of the invention to provide a position-signalling device which can be constructed in a modular manner, simplifying the selection of the most various possibilities for the processing of information regarding the position of the step switch or the like, and thereby the remote reading, or display of this information.

SUMMARY OF THE INVENTION

According to the invention the position-signalling device consists of two physically separate subassemblies, which are electrically interconnected. These subassemblies include
- a signalling-contact array or assembly for obtaining information about the respective operational position of the motor drive, and
- a position-signalling module for processing the information corresponding to the desired manner of displaying the operational position of the motor drive.

The solution offered by the invention is particularly advantageous because of the universal construction of the entire position-signalling device, which no longer has to be tailored to the particular requirements of certain applications.

Due to the physical separation according to the invention between the information-collecting signalling-contacts array on the one hand, and the position-signalling module for information processing, which can be easily replaced, on the other hand, a simple adaptation to all industrial conditions is possible merely by replacing the position-signalling module. A further advantage of the invention consists in that the arrangement of the components required for information processing, such as rheostats (for dial-type instruments), diodes (for coded information) or relays(for break contact rows is eliminated from the actual signalling-contact array. This is a significant difference over the state of the art. The signalling contact array is thereby simplified and technologically becomes easier to manufacture, the manufacture of the above-mentioned components in the separate position-signalling module is also more favorable, even in the case of possibly required replacement of defective components during operation.

It is particularly advantageous that the easily replaceable position-signalling module can serve at the same time as the transfer point for the electric connection line leading to a remote display.

In a further particularly advantageous embodiment of the invention, the electric components in the separate position-signalling modules are each arranged and wired in such a manner that by simply rotating the corresponding plug connection by 180 degrees and repositioning on the corresponding module, the detected rotation sense of the passed-through operating positions can be changed.

BRIEF DESCRIPTION OF THE DRAWING

In the drawing:

FIG. 3 is a correspondence table between the separate contact pieces of the position-signalling device, which correspond to the possible operational positions 1–36 of the motor drive and to the individual pins of the transfer plug;

SPECIFIC DESCRIPTION

Figure 1:
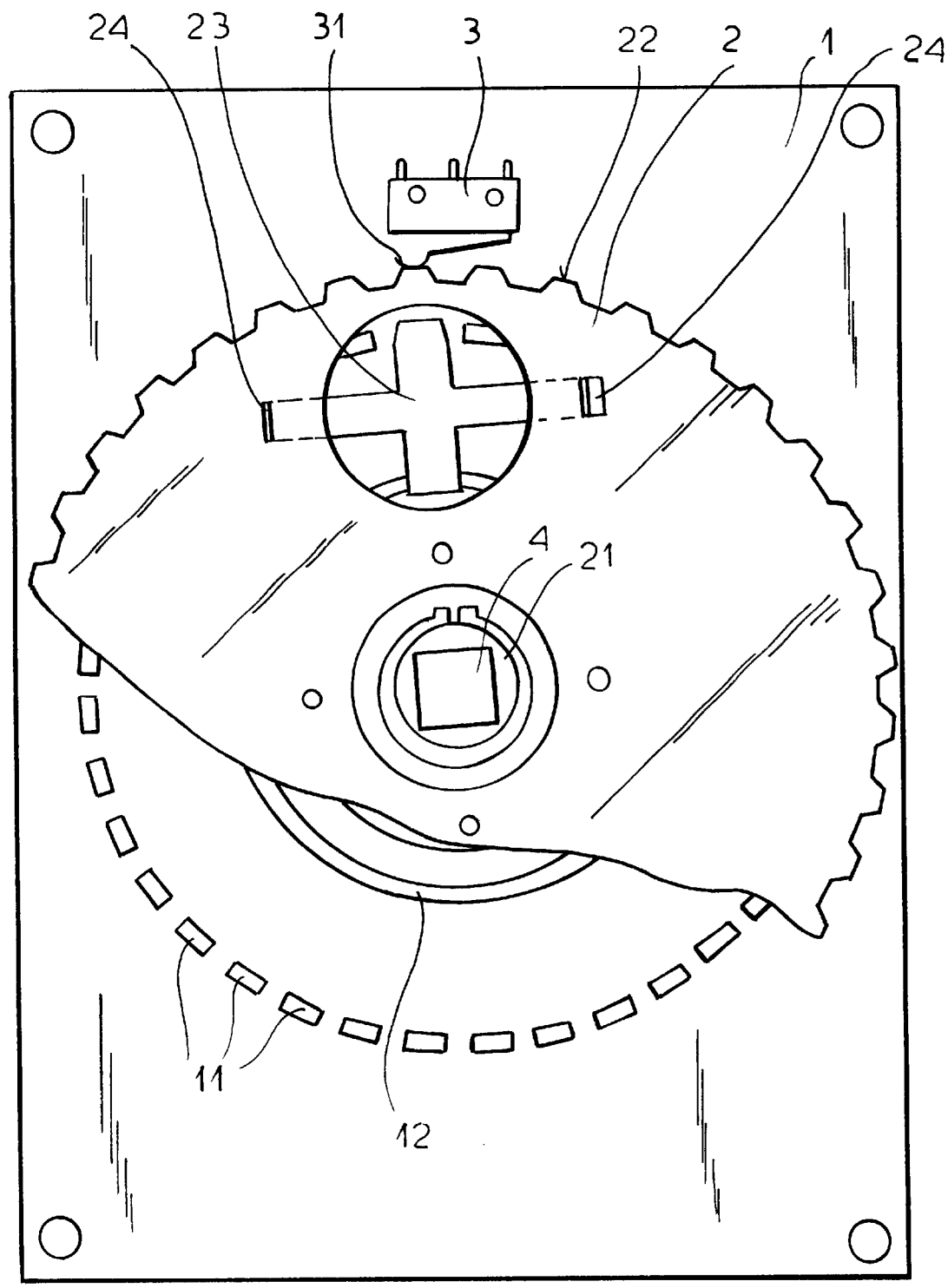
FIG. 1 is an elevational view, partly broken away, a signalling-contact array as a component of the position-signalling device of the invention, shown separately.

The signalling-contact array shown in FIG. 1 has a plate 1 with a circular array of mutually insulated separate signalling contacts 11. It further has a continuous output contact ring 12 concentric with the array. Outside the contact path on plate 1 a microswitch 3 has an actuation lever 31. The signalling-contact array further consists of a cam disk 2, which is rotatably supported on the plate 1, by a bearing 21 provided in the center of the concentric contact paths of signalling contacts 11 and output contact ring 12. The drive is effectuated by a shaft 4. The edge of the cam disk 2 has edge bumps 22 which correspond with the actuation lever 31 of the microswitch 3. On the side of the cam disk 2 facing the plate 1, a conductive contact bridge 23 is arranged, which on the one end rides on the signalling contacts 11 and with its other free end is in continuous sliding contact with the output contact ring 12. The contact bridge 23 is inserted in openings 24.

When the cam disk 2 rotates, different separate signalling contacts 11 can be connected one after the other to output contact ring 12. At the same time the microswitch 3 included in the electric circuit is actuated by the edge bumps 22. This happens in such a manner that the microswitch opens the electric circuit each time before the contact bridge 23 completely leaves the latest signalling contact 11 during a rotation, and closes the electric circuit again, after the contact bridge 23 has reached the new signalling contact. In this way an interrupted switch-over takes place. Such an arrangement is described in German patent document 197 05 576.

Figure 2:
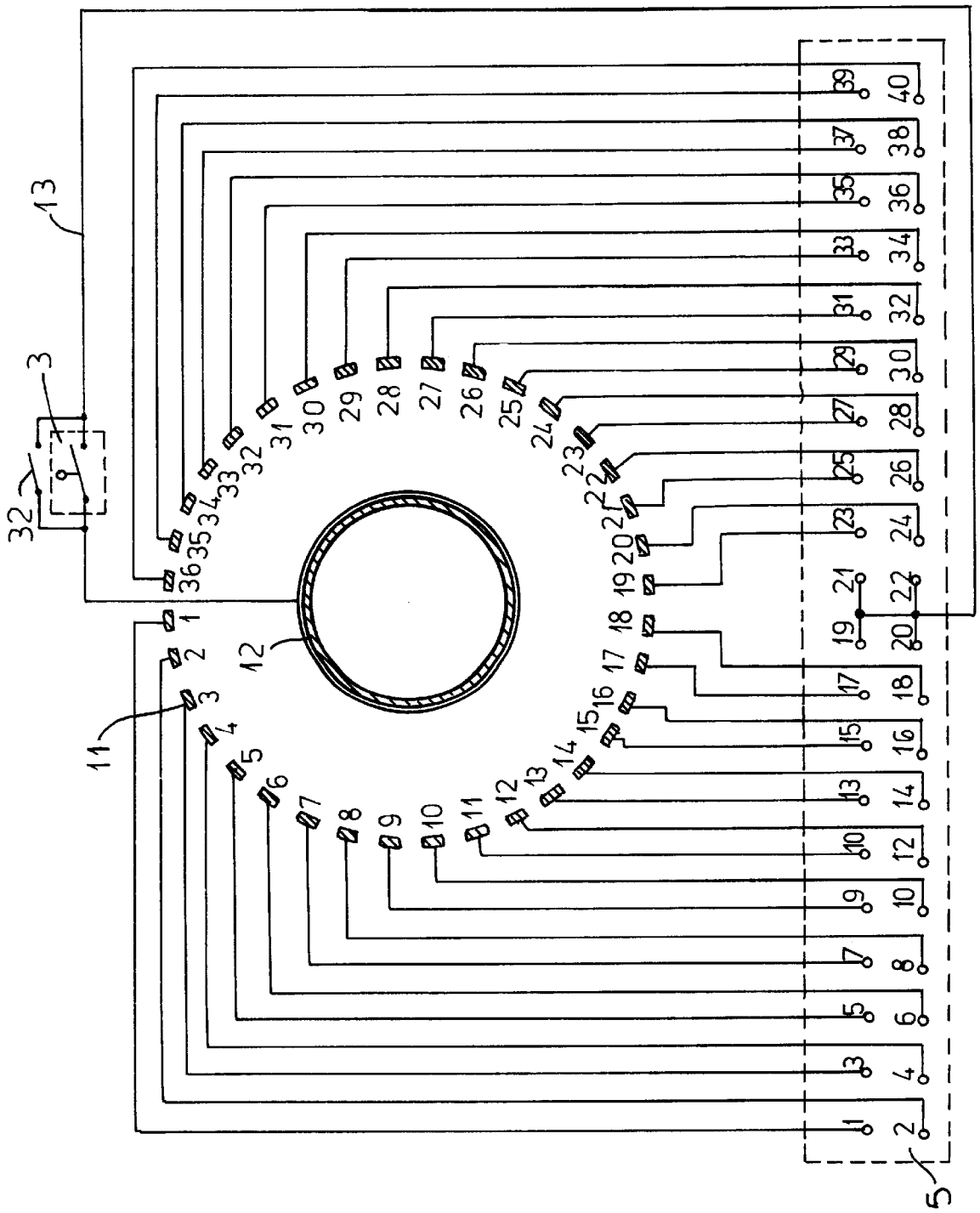
FIG. 2 is a diagram of the wiring of this signalling contacts array to its first transfer plug.

FIG. 2 shows that on the signalling-contacts array a first plug connector 5 is arranged, whose pins 1 to 40 connected with the signalling contacts and with the electric circuit formed by the output contact ring and the microswitch. Further from this FIG. can be seen that the microswitch 3 can be bridged by means of an electrically conductive bridge 32, i.e. can be made ineffective by the same. It has already been mentioned above that the microswitch 3 effects an interrupting switch-over. If in particular application cases, e.g. for triggering of a signalling instrument, a bridging switch-over is desired, then the microswitch 3 can be rendered ineffective in a simple manner by the shunt 32, without having to modify the construction of the signalling-contacts array itself.

FIG. 3 shows a correspondence table of the wiring represented in FIG. 2. In the upper row the possible operational positions 1 to 36 assigned to corresponding signalling contacts are shown. The lower row comprises pins 1 to 40 of the first plug connector 5 which are electrically connected with the contacts. In relation to FIG. 2 it can be seen that the pins 19 to 22 are electrically connected, not with certain signalling contacts, but with the electric circuit formed by the output contact ring 12 and the microswitch 3.

Figure 4:
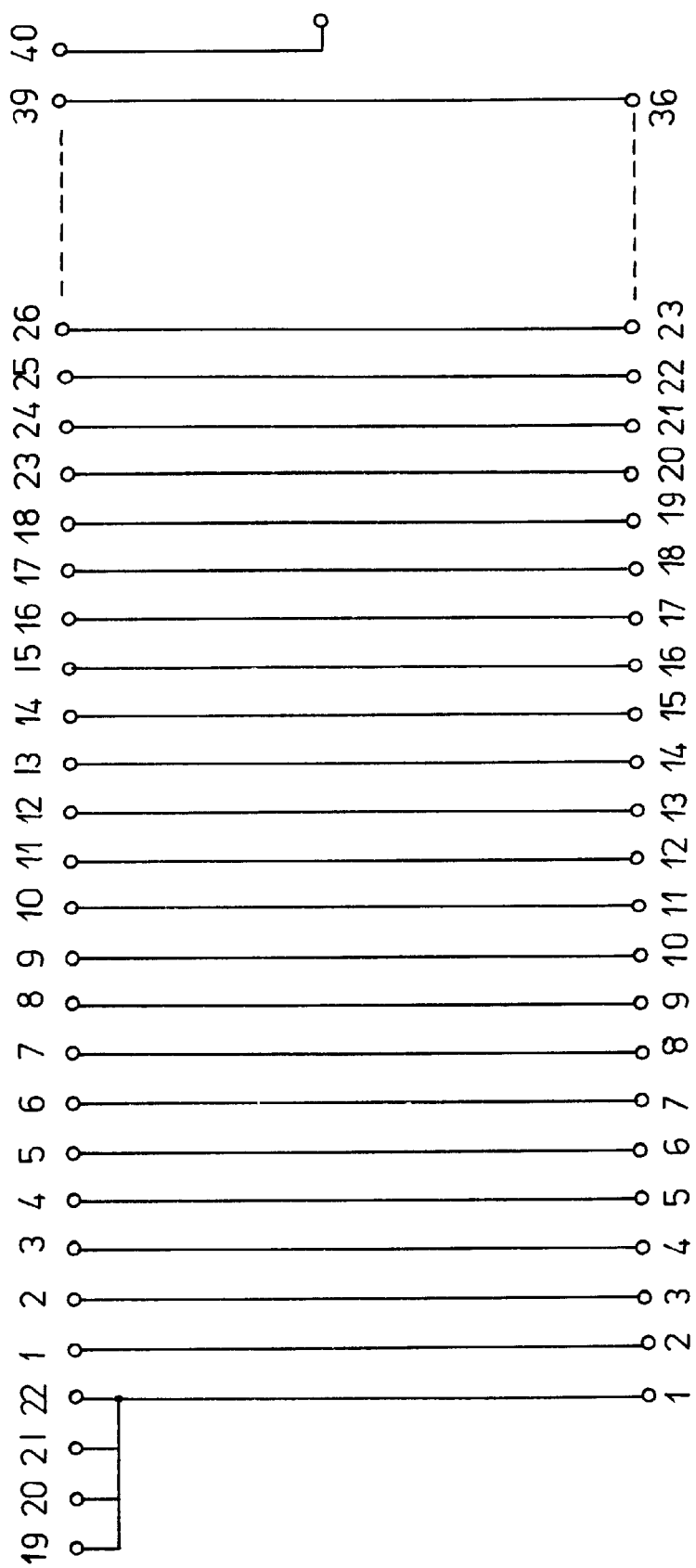
FIG. 4 is a circuit diagram of a first position-signalling module.

FIG. 4 shows the circuit diagram of a first position-signalling module, wherein physically separated from the heretofore described signalling-contacts array, the data processing of the electric information transmitted through the first plug connector 5 takes place. This case deals with a simple arrangement of not normally open contacts, wherein to each single operational position a corresponding output signal is assigned, leading for instance to a separate indication lamp.

Figure 5:
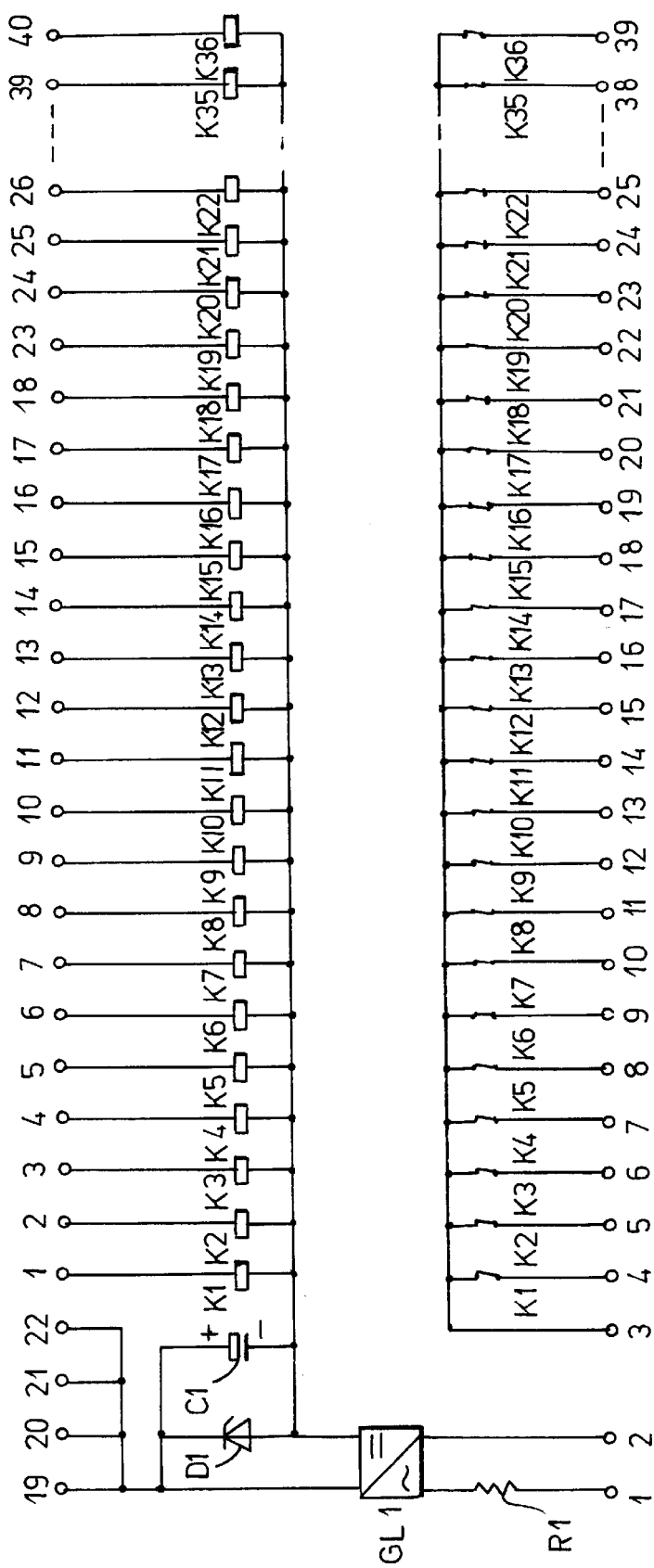
FIG. 5 is a further circuit diagram of a second position-signalling module.

FIG. 5 shows a further circuit diagram of a second possible position-signalling module, which works as a break contact sequence.

Figure 6:
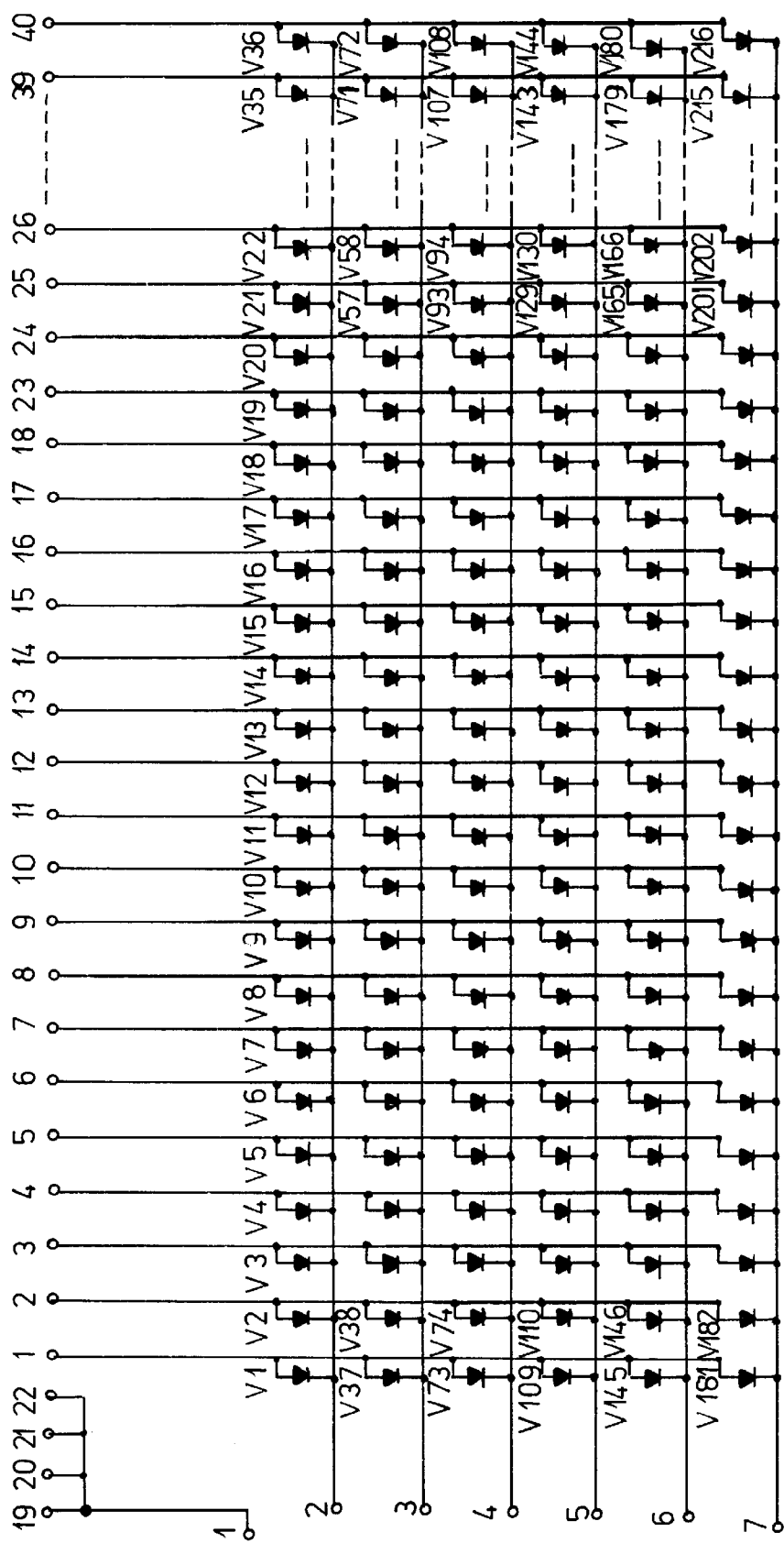
FIG. 6 is a further circuit diagram of a third position-signalling module.

FIG. 6 shows again a further circuit diagram of a further possible position-signalling module, wherein due to the selected wiring and the illustrated diode matrix a BCD-coded information is produced about the respective operational position, and is made available at the transfer point shown to the left.

FIG. 7 shows again a further circuit diagram of yet another possible position-signalling module, which is here designed as a rheostat arrangement, so that at the transfer points shown at the bottom information suited for triggering a crossed coil instrument is produced. In this variant, wherein a continuously operating indication instrument is energized, a bridged wiring of the signalling contacts is required. Therefore in this case the above-described microswitch 3 has to be bypassed by the also previously described shunt 32, so that the microswitch function can be made ineffective.

Figure 8:
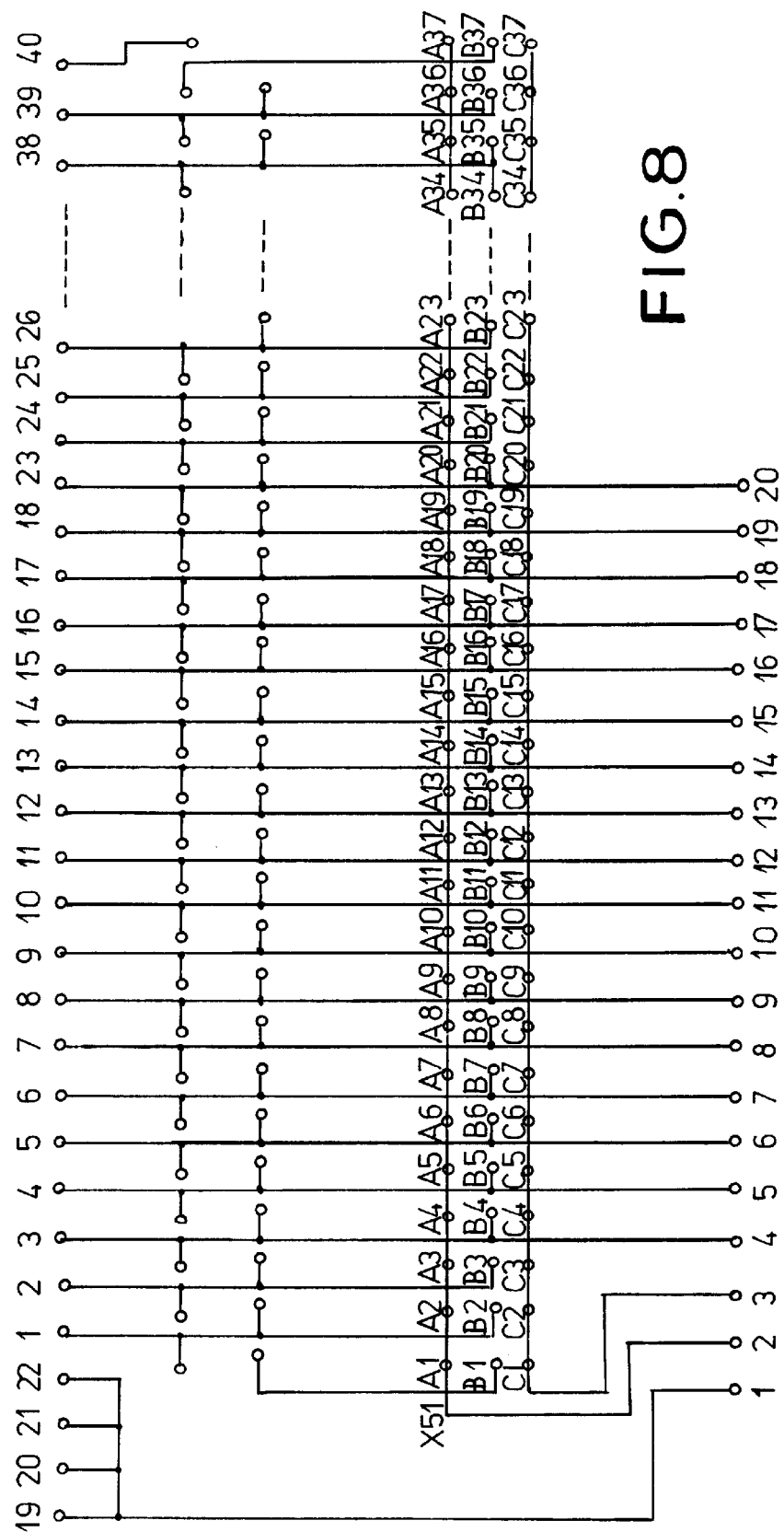
FIG. 8 is a further circuit diagram of a fifth position-signalling module.

Finally FIG. 8 shows yet another circuit diagram of a fifth position-signalling module. This position-signalling module is designed as a so-called universal module, whereby no fixed electric wiring is provided inside, but electric contact points can be mutually connected at will by means of contact bridges, so-called jumpers. Such a universal arrangement as shown here is suitable for a maximum of 35 positions, in the design with the break contact sequence only for a maximum of 19 operational positions.

From the five different circuit diagrams of possible position-signalling modules shown as examples in FIGS. 4 to 8, each of them built as a physically separate module from the signalling-contact array—which always remains the same—is and connectable to the signalling-contact array, it becomes clear that by a selected arrangement of one of the two assemblies—the always unchanged signalling contact array and the variable position-signalling module—it is possible to meet in a simple manner very different requirements. Thereby in each case only the corresponding position-signalling module has to be used, the remaining parts of the entire assembly remain unchanged. It is also possible to later change the function in a simple manner by replacing the respective position-signalling module, thereby adapting the entire assembly to changed indication requirements.

Figure 7:
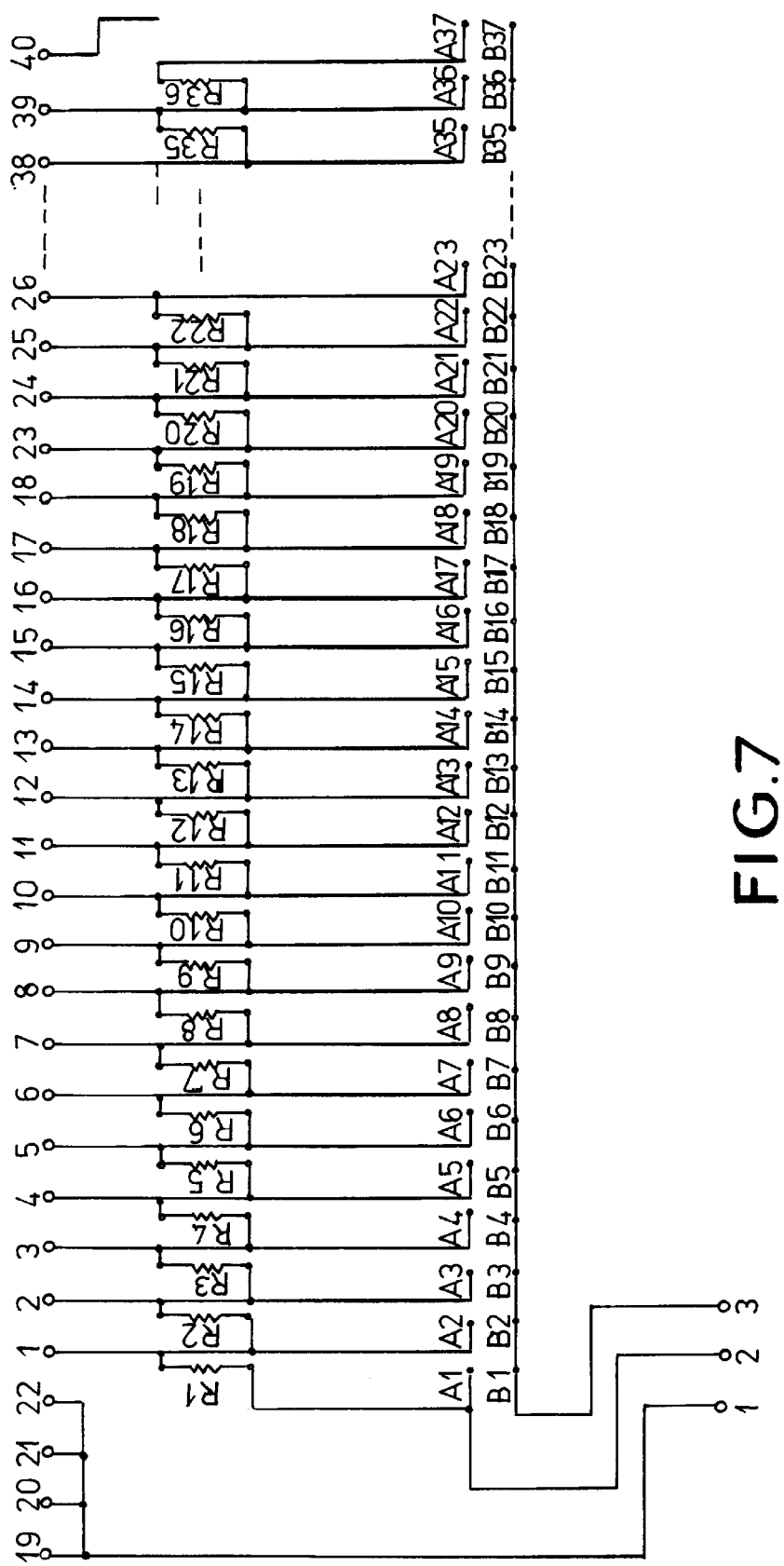
FIG. 7 is a further circuit diagram of a fourth position-signalling module.
Figure 9:
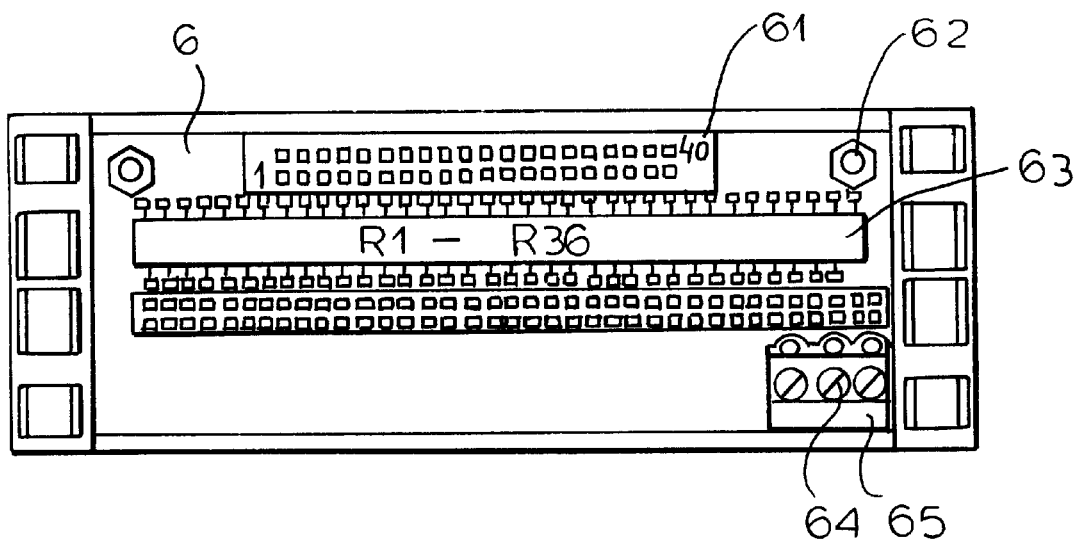
FIG. 9 is an elevational view of the fourth position-signalling module having the circuit diagram shown in FIG. 7.

FIG. 9 shows a position-signalling module 6, whose circuit diagram was already illustrated in FIG. 7 and has been previously explained. It has a further plug connector 61 which on the inside is electrically connected with the individual rheostats 63. Further on the module fastening means 62 are provided. On the underside the output terminals 64 are arranged. The reference numerals 65 shown there correspond to the output reference numerals 1, 2, 3 shown in the lower part of FIG. 7 and lead to the display instrument.

Figure 10:
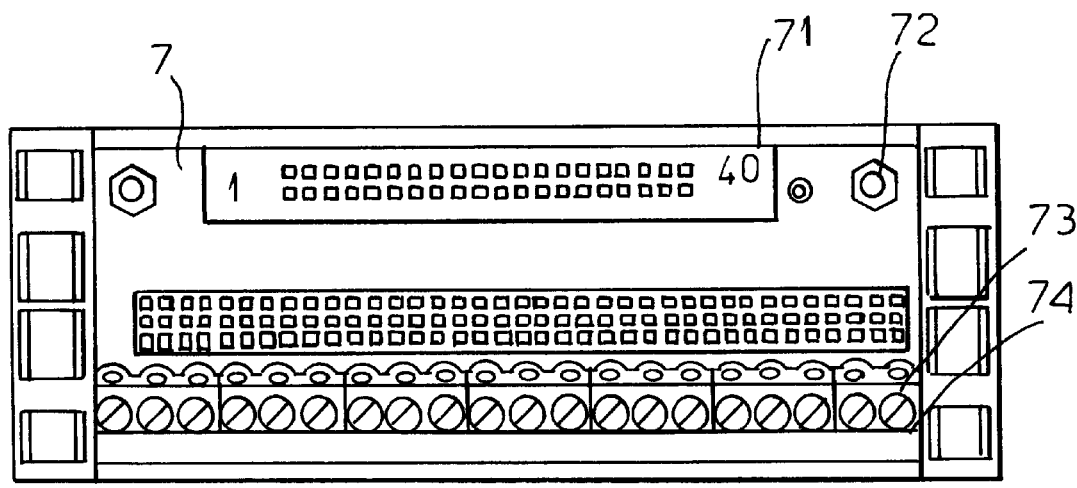
FIG. 10 is an elevational view of the fifth position-signalling module having the circuit diagram shown in FIG. 8.

FIG. 10 shows a further position signalling module 7, whose circuit diagram was already explained in FIG. 8, it deals with an universal, retrofittable construction. Here too a further plug connector 71 is provided, which on the inside is in electric connection with the already previously explained circuit. On the underside again output terminals 73 are provided, whose reference numeral 74 corresponds to the reference numeral of the output points shown 1, 2 . . . 19, 20 in the lower part of the pertaining circuit diagram shown in FIG. 8. By means of contact bridges which can be attached later, in this position-signalling module 7 the respective matrix for information processing can also be later freely selected.

Finally FIG. 11 summarizes again the entire position-signalling device of the invention in a schematic representation. In the upper part there is the signalling-contact array 1, which has the first connector plug 5 with the afore-described electrically associated connections.

Figure 11:
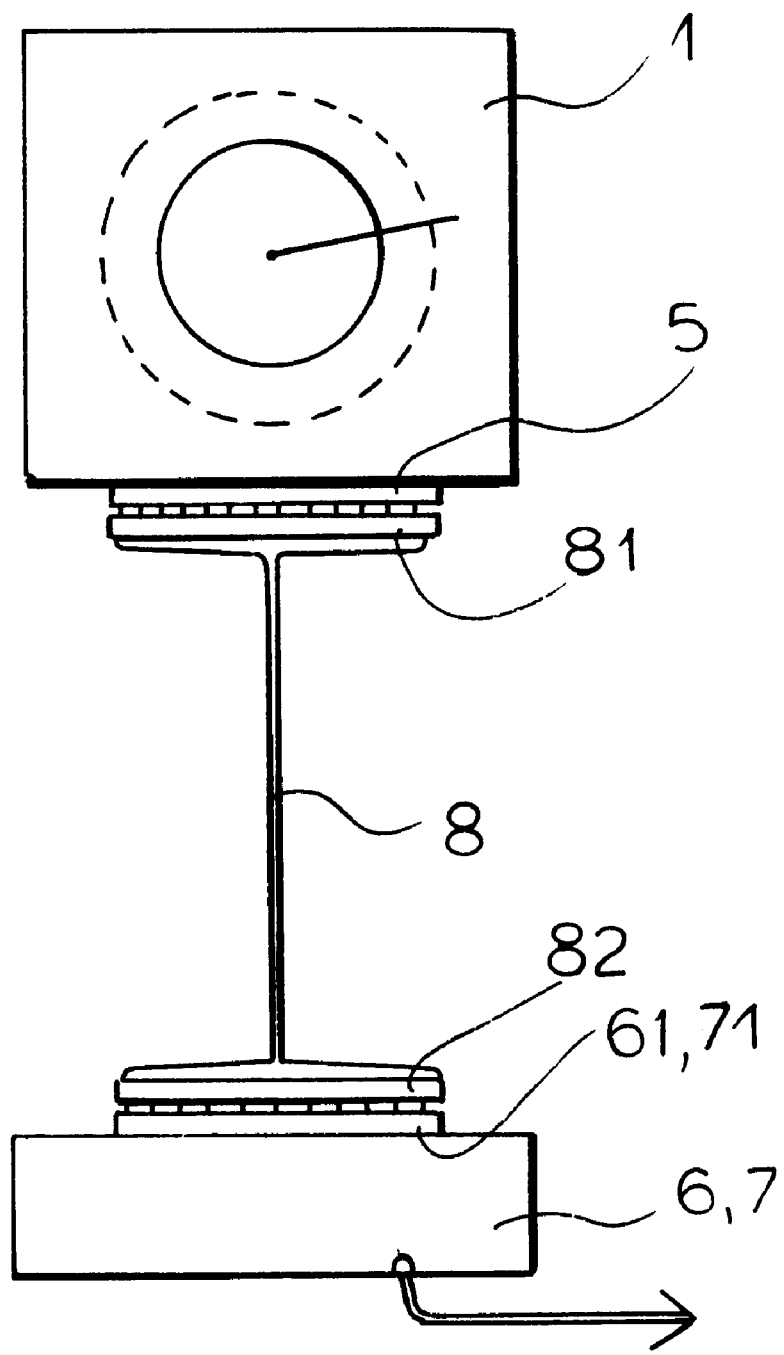
FIG. 11 is an elevational view of a position-signalling device according to the invention.

Physically separated therefrom there are position-signalling modules, for instance the described modules 6 or 7 illustrated in FIGS. 9 and 10, which each also have a connector plug 61, respectively 71. The connection between these two assemblies is established through an electric connection line 8, which at both its ends has plug receptacles 81, 82, which correspond respectively with the pins of the plug connector 5 on one side and with 61, respectively 71 on the other side. Naturally instead of the described modules 6 or 7 also any other such modules with different information processing modi can be connected. This way, as already mentioned, in a simple manner without intervention in the area of the signalling-contacts array 1, it is possible to achieve a simple adaptation of the entire device to any form of display, which in FIG. 11 is only suggested by a circle with an arrow.

What is claimed is:

1. A position-signalling device for a motor drive of a step switch or tap changer, said position-signalling device comprising:

a signalling-contacts module including:
  a circular array of spaced apart fixed contacts each representing a position of said motor drive,
  a rotatable contact successively engageable with said fixed contacts of said array and connectable in an electric circuit,
  a member connecting said motor drive with said rotatable contact,
  a first module connector plug having respective positions connected to said fixed contacts and with said electric circuit; and
  a microswitch connected in said electric circuit and adapted to interrupt electrical connection with said rotatable contact during switching between successive fixed contacts;

a connector having a first connection plug connected with said first module connector plug in a first connector pair, a second connection plug and a line interconnecting said connection plugs; and a position signalling module selected from a set of position signalling modules each having a respective second module connector plug connectable to said second connection plug in a second connector pair, said position signalling modules comprising:
  output connections connectable to a display of position of said motor drive, and
  conductive paths between said second connection plug and said output connections varying among the position signalling modules of said set to relate said output connections to said fixed contacts in dependence upon the position signalling module selected, one of said plugs of one of said pairs being reversible in position relative to the other plug of said one of said pairs to signal different senses of rotation of the respective motor drive.

2. The position-signalling device defined in claim 1 wherein said conductive paths are structured to enable said display by indicator lamps.

3. The position-signalling device defined in claim 1 wherein said conductive paths are structured to enable said display by a dial instrument.

4. The position-signalling device defined in claim 1 wherein said conductive paths include a diode matrix.

5. The position-signalling device defined in claim 1, further comprising a shunt for said microswitch.

* * * * *